United States Patent Office.

BENJAMIN R. SMITH AND JOHN CAMPBELL HARRIS, OF PHILADELPHIA, PENNSYLVANIA.

Letters Patent No. 111,267, dated January 24, 1871.

IMPROVEMENT IN PLASTERS FOR WALLS.

The Schedule referred to in these Letters Patent and making part of the same.

We, BENJAMIN R. SMITH and JOHN CAMPBELL HARRIS, of the city and county of Philadelphia and State of Pennsylvania, have invented a new and useful Improvement in the Manufacture of a Plaster for the Walls and Ceilings of Buildings, and for other purposes.

The following is a specification of our improvement.

Nature and Objects of the Invention.

Our invention consists in the preparation of a new material for coating walls and ceilings, the object of our improvement being to prepare an article ready for instant use, when mixed with water, without the necessity of mixing any other substance with it.

General Description.

Our improved compound is prepared by mixing dried and powdered hydrate of lime with crude ground plaster or gypsum, and calcining the mixture; or, in mixing the dry hydrate of lime with plaster which has been already calcined. Sand may be also mixed with the compound when such a finish as is given by sand is wanted.

Our compound, made as above described, can be used for all purposes for which calcined plaster is employed, and it possesses all the good qualities of the material in customary use for hard-finishing walls and ceilings.

When ordinary calcined plaster is used on walls, ceilings, cornices, &c., it is necessary to mix it before using with what is called "white stuff," which is made by the plasterer, and the preparation of which is tedious and unsatisfactory. The process requires several days for its perfection, and, as it is usually conducted in the public streets, it interferes much with the proper use of the same. The dirt and dust, which is so constantly flying, gets into this "white stuff" to such an extent that, when the plaster is mixed with it, it is impossible to get a pure white finish.

With our compound no such risk is run, as it is always ready for mixing with water and using, and the plasterer thereby saves the labor, time, and expense of making and manipulating the "white stuff," and gets a white wall, instead of one clouded with dirt, for his pains.

Our composition is taken to the room to be plastered in a dry state, in any necessary quantities, and, as it is required for use, it is mixed with water and immediately worked onto the wall.

A whiter and better wall is thus produced at a lower cost than by the usual process.

Claim.

We claim as our invention—

The compound plaster, produced of the materials and in the manner substantially as herein set forth.

BENJAMIN R. SMITH.
JOHN CAMPBELL HARRIS.

Witnesses:
   O. A. KNIPE,
   C. L. LOCKWOOD.